United States Patent Office 3,449,432
Patented June 10, 1969

3,449,432
HYDROXYALKYL ETHER SUBSTITUTED
TERTIARY AMINES
Cornelis Borstlap and Pieter M. Bakker, Amsterdam,
Netherlands, assignors to Shell Oil Company, New
York, N.Y., a corporation of Delaware
No Drawing. Filed May 9, 1966, Ser. No. 548,385
Claims priority, application Netherlands, May 31, 1965,
6506842
Int. Cl. C07c 93/02
U.S. Cl. 260—584 4 Claims

ABSTRACT OF THE DISCLOSURE

The hydroxyalkyl ether substituted tertiary amines obtained by (1) reacting an olefin with an aliphatic polyol in the presence of a halogenating agent and (2) reacting the resulting hydroxy alkyl ether of a vic-halohydrin with a tertiary alkyl amine, thereby forming a hydroxy alkyl ether substituted tertiary amine by replacement of the halogen atom of said vic-halohydrin ether. The tertiary amino-substituted hydroxyalkyl ethers so produced can be oxidized to the corresponding amine oxides. These compounds are useful as detergents.

This invention relates to novel ethers of vic-halohydrins which are particularly suitable for production of surface-active compounds having especially advantageous properties. It also deals with efficient methods for producing these new compounds.

Various methods are known for producing ethers of vic-halohydrins. German patent specification 537,696, for example, describes the preparation of the chlorohydrin ethers from ethylene, chlorine and ethanol, or n-butanol. Small quantities of water, for example 0.1% are recommended for accelerating this reaction. According to the U.S. patent specification 2,207,983 t-alkyl hypochlorites and hypobromites have also been used as halogenating agents in this type of reaction. An example is the reaction of 2-pentene and methanol, in equimolar quantities, with t-butyl hypochlorite. Finally, chloroalkoxylations have been described in the J. Am. Chem. Soc. 63 (1941), 858–860, where the reactions of various lower olefins with chlorine or t-butyl hypochlorite and primary monohydric alcohols are mentioned. Acids, such as p-toluenesulfonic acid, were found to catalyze this reaction.

In all known cases monohydric alcohols have been invariably used in these reactions. The preparation of halohydrin ethers with free alcoholic hydroxyl groups in the molecule was obviously not considered. No one suggested the use of polyhydric alcohols in this type of reaction because it was to be expected that the free hydroxyl group(s) of any halohydrin ethers formed in the first instance, would also take part in the reaction with formation of halogen ethers having two or more ether bonds in the molecule at the expense of the desired product.

Surprisingly, it has now been found that hydroxy alkyl ethers of vic-halohydrins can be prepared by using polyhydric alcohols, and that the undesired polyethers are not formed at all or only to a very small extent. Another advantageous feature of the invention in one of its modifications is based upon the discovery that in the use of free chlorine or bromine as halogenating agent a considerable increase in yield can be obtained if the reaction is performed in a polar solvent. Finally, the halohydrin ethers obtained according to the invention are, as previously indicated, new compounds, and have been found to be valuable base materials for the preparation of other novel products useful as detergents or detergent components.

The new process is characterized in that one allows to react together: (a) an olefin with at least 8 carbon atoms in the molecule, (b) a polyhydric alcohol, and (c) either chlorine or bromine, preferably, in the presence of one or more polar solvents, or a t-alkyl hypochlorite or hypobromite.

The novel ethers obtainable in this way are usually mixtures of isomers. These have a hydroxyalkyl group linked to an ether oxygen atom which is attached to a carbon atom to which a chloro- or bromo-substituted carbon is also attached, and also have a saturated unsubstituted alkyl group of at least 6 carbon atoms joined to said substituted carbon atom directly or through the ether-substituted carbon atom. As a result of this unique structure, one can obtain highly advantageous surface active products according to the invention. These are new ethoxylated and/or sulfated products or tertiary amines or amine oxides, etc., depending on the reaction carried out as the second step of the process.

In the first step of the process according to the invention one starts from an olefin that is either branched or unbranched, and which contains at least 8 carbon atoms in the molecule. The number of C-atoms is usually not larger than 20 and is preferably 10 to 18, and in particular 12 to 16. Olefins with straight, or at least only slightly branched, carbon chains are preferred. In general it is desirable that branchings, if present, should occur in not more than 2 places, for example in the form of methyl or ethyl groups. Very suitable are alpha-olefins, that is olefins with the double bond in a terminal position. Excellent results are obtained for example with 1-dodecene, 1-tetradecene and/or 1-hexadecene. One can also use with advantage olefins formed during cracking of paraffinic hydrocarbons, such as high-boiling paraffinic fractions obtained in the distillation of mineral oils, particularly after removal of branched and/or cyclic paraffins by a treatment with urea.

As polyhydric alcohol one uses generally an aliphatic, di- or trihydric alcohol with a carbon chain which may be branched or unbranched and/or interrupted by oxygen atoms, and which may, if desired, contain substituents, such as halogen atoms. Primary and secondary polyols with 2 to 6 carbon atoms in the molecule are preferred. Eligible polyols are for example: ethylene glycol, glycerol, the propanediols, and butanediols, e.g. trimethylene glycol, hexanediols and -triols, as 1,2,6-hexanetriol, for instance, polyhydroxy halohydrins, such as 3 - chloropropane - 1,2-diol and 2-chloropropane-1,3-diol, glycol ethers, as diethylene glycol and triethylene glycol, for example. Particularly useful are polyols having straight carbon chains and at least two primary hydroxy groups. Also mixtures of polyhydric alcohols can be used, if desired, instead of individual polyols. Special preference is given to ethylene glycol.

The halogenating agent used according to the application is chlorine or bromine, or the corresponding t-alkyl hypohalites. Whereas in the latter case solvents may or may not be present, very much better results with respect to yields are obtained in the application of the free halogens if the reaction is conducted in a polar solvent. The solvents suitable for this purpose should of course be inert, i.e. they must not lead to side reactions. Solvents which under the reaction conditions are, for example, halogenated, or which react with the olefin used, should therefore be excluded. Small quantities of reactive solvents can in certain cases be tolerated, however, they should as a rule not exceed 8% m, calculated on the olefin. Thus, catalytic quantities of water, for example, amounts of the order of about 0.01 to about 0.1 mole per mole of olefin, often have a favorable effect on the yield, while larger quantities promote a side reaction, namely the formation of halohydrins.

Of the polar solvents, the aprotic ones in particular have proved very suitable. This can probably be ascribed to their solvating effect on cations formed as intermediaries. The reaction mechanism, however, is not very clear, and other possible mechanisms are not precluded here.

Suitable polar solvents are, for example, nitro compounds, such as nitroalkanes, for instance nitromethane, nitroethane and 1-nitropropane, and nitro aromatics such as nitrobenzene, the nitrotoluenes and -xylenes; sulfolane (thiolane-1,1-dioxide) and the homologues thereof substituted in the nucleus, such as 2-methyl, 3-methyl, 2,4-dimethyl and 3,4-dimethyl-sulfolane; dialkyl sulfoxides, such as dimethyl sulfoxide, and the like; dialkylformamides such as dimethylformamide, and in particular ethers such as 1,2-dimethoxyethane, tetrahydropyrane, dioxane and tetrahydrofurane, as well as derivatives and homologues thereof. Especially cyclic ethers, such as the above, have proved to be very advantageous. One preferably uses 1,4-dioxane or tetrahydrofuran. If desired, one can use a mixture of such polar solvents. Non-polar diluents, for example a hydrocarbon such as benzene, can also be used in admixture with the polar solvent or mixture of polar solvents.

The above solvents usually promote the mutual solubility of the reaction components. In general solvents which readily take up both the olefin and the polyhydric alcohol are preferred. In general it is advisable to perform the reaction in a homogeneous medium. Preferably at least enough solvent is used to keep the reaction mixture in solution at the temperature applied. If desired, however, one can also use a dispersion, for example by adding a suitable emulsifier.

The t-alkyl hypohalites, particularly the hypochlorites, have proved to be even more advantageous as halogenating agent than the free halogens, for considerably higher yields are obtained and the use of a polar solvent appears not to be necessary in these cases. If desired, however, one or more solvents can also be used when employing tert.alkyl hypohalites and the halogenating agent. Catalytic quantities of water, for example 0.01 to 0.08 mole per mole of olefin, usually have a favorable effect on the yield.

The hypohalites concerned are derived from a tertiary alcohol which preferably contains not more than 7 carbon atoms in the molecule, such as t-butyl alcohol, t-pentyl alcohol and 3-ethylpentanol. Preference is given to t-butyl hypochlorite.

The halogenating agents used according to this application are preferably chlorinating agents, i.e. chlorine or a t-alkyl hypochlorite. In general one uses about equimolar quantities of halogenating agents and olefin but larger or smaller proportions are feasible, for instance, about 0.5 to about 1.5 moles of tert.alkyl hypohalite per mole of olefin. An excess of polyhydric alcohol is usually desirable and proportions in the range of about 2 to 6 moles per mole of olefin have proved advantageous. Only when free halogens are used as halogenating agent does an even greater excess of the alcohol lead to some improvement in yield.

The reaction temperature is in general between −10 and 120° C. When t-alkyl hypohalites are used one preferably operates at about 30 to 100° C., in particular at about 40 to about 50° C. If, on the other hand, one uses a free halogen, operation at room temperature, for example 20° C., is more advantageous, because higher temperatures have little if any influence on the yield obtained. The haloalkoxylations proceed smoothly at atmospheric pressure. Higher pressures, however, for instance up to 2000 p.s.i.g. or more, are not precluded.

The process according to the application can be performed batchwise or continuously.

The reaction according to the invention often leads to a mixture of isomeric halohydrin ethers. Thus, the chloroalkoxylation product obtained from 1-dodecene and ethylene glycol usually contains 60–90% of the isomer A and 10 to 40% of the isomer B:

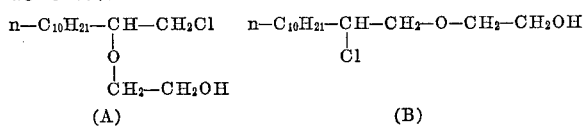

(A)                (B)

The products prepared according to the application are new compounds which can be represented by the general formulas

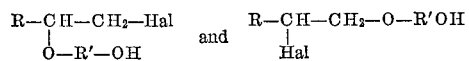

where R represents a saturated, unsubstituted alkyl of 6 to 18 carbon atoms, R' is saturated, divalent radical composed of carbon, hydrogen, chlorine, bromine, and hydroxy or ether oxygen atoms in which there are 2 to about 8 carbon atoms with the linkages to the ether and hydroxyl oxygen atoms shown in the formulas being attached to different carbon atoms, and Hal is chlorine or bromine. Especially advantageous are those in which R' is alkylene of 2 to 6 carbon atoms. As previously pointed out, they are eminently suitable as base materials for the preparation of surface-active agents suitable as detergents. In particular, the sulfuric esters obtained by sulfation of a free hydroxyl group, or their salts, are good detergents and they possess a high foaming power. They were not previously known. Important detergents or detergent components are in particular the sulfates of 1,2-chlorohydrin glycol ethers derived from olefins with 10 to 16 carbon atoms per molecule. The sulfation can be carried out directly or, if desired, after first alkoxylating at the free hydroxyl group, advantageously by reaction with an oxirane compound, suitably a lower olefin oxide such as ethylene or propylene oxide, or the like.

In carrying out the sulfation, any of the conventional sulfating agents can be used successfully. Concentrated sulfuric acid, for example of about 94.5 to 100% w. concentration, chlorosulfonic acid, oleum, or SO₃ as gas or in liquid form, are examples of suitable sulfating agents. Inert solvents such as SO₂, CCl₄, beta-chloroethyl ether, etc., are useful especially when using SO₃ as the sulfating agent. As a rule, proportions of sulfating agent of about 0.5 to about 4 moles per mole of hydroxyalkyl halo ether are suitable with ratios in the range of about 0.8 to about 1.2 being usually advantageous. The temperature of sulfation which will be most suitable will depend upon the particular sulfating agent which is chosen. With concentrated sulfuric acid, oleum or chlorosulfonic acid, for instance, relatively low temperatures of the order of about −10° to about +15° C. are generally desirable, at least in the initial stages of the reaction. In the later stages of reaction temperatures up to about 50° C. or higher may be acceptable. Any suitable method of intimately contacting the reactants under batch or continuous methods of operation is suitable for the sulfation.

The sulfation product is most advantageously converted to a salt, preferably a water-soluble salt such as an alkali metal; ammonium or alkanolamine salt, such as a sodium, potassium or mono-, di- or tri-ethanolamine salt, before recovery. This is conveniently accomplished by neutralization with the corresponding base, for instance the alkali metal or ammonium hydroxide or carbonate or bicarbonate or with a suitable amine. Excess sulfating agent, if any is present in the sulfation product, is advantageously removed, at least in part, prior to neutralization in order to obtain products with lower inorganic salt content. Dilution with water and stratification and separation of the resulting phases with or without the aid of water-insoluble solvents for the sulfated ether, is one suitable way of separating excess sulfating agent before neutralization. In such separations, as well as in the neutralization whether or not prior removal of excess sulfating agent is employed, it is usually desirable to operate at relatively low temperatures of below about 50° C. in order to obtain products of highest quality.

Where the hydroxyalkyl halo ether is to be alkoxylated before sulfation, the hydroxyalkyl halo ether can be reacted with the chosen alkylene oxide or mixture of alkylene oxides using an alkaline condensation catalyst such as, for example, sodium hydroxide, sodium alkoxide, a quaternary ammonium base, or the like. Alternatively an acidic catalyst such as sulfuric or phosphoric acids, sodium bisulfate, bleaching clays, boron trifluoride, and the like, can be used. One can add ethylene and/or propylene oxides to a heated and stirred mixture of the hydroxyalkyl ether in an autoclave using a feed rate such that the alkylene oxide reacts as fast as it is introduced and no excess of unreacted alkylene oxide accumulated in the mixture. The temperature which will be most desirable in carrying out the condensation will depend upon the activity of the catalyst chosen which in turn will vary with its concentration in the reaction mixture, but as a rule temperatures of the order of about 75° to about 200° C. will be suitable.

Addition of an average of about 1 to 9 moles of alkylene oxide per mole of starting hydroxyalkyl chloro or bromo ether yields products with advantageous properties after sulfonation. But larger proportions of alkylene oxide of the order of about 10 to 20 moles per mole of hydroxyalkyl halo ether may be desirable where non-ionic detergent products are desired. Successive condensation of different alkylene oxides can be used instead of condensing one alkylene oxide only or a mixture of alkylene oxides simultaneously. In making condensates by such successive condensation, it is advantageous for ease of subsequent sulfation to conduct the process so as to obtain polyoxyalkylene chains terminating in primary hydroxyl groups. For the same reason it is preferred to use hydroxyalkyl halo ethers with a primary hydroxyl group when no condensation with alkylene oxide is to be carried out prior to sulfation. Corresponding products which have secondary hydroxy groups to be sulfated can, however, be used by exercise of greater care in the sulfation step. In all these products the presence of the chlorine or bromine atom on the carbon atom adjacent to that to which is attached the ether oxygen atom which links the sulfate group to the hydrophobic alkyl chain, confers unexpectedly advantageous properties to the products in their application as surface-active agents. Especially useful products are the isomers which can be represented by the formula

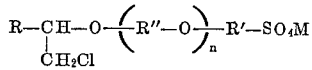

where R and R' are as before indicated, R'' is a divalent radical of the group represented by R', M is a salt forming cation such as alkali metal, ammonium or amine and $n$ is an integer equal to 0 to 5. Especially useful are those in which R' and R'' are each alkylene of 2 to 6 carbon atoms. Those in which $n$ is zero correspond to the new products obtained via direct sulfation of the hydroxyalkyl halo ethers while those having a larger value for $n$ are products of sulfating alkylene oxide condensation products of these ethers, $n$ corresponding to the average number of moles of alkylene oxide introduced per mole of ether.

In another advantageous modification of the invention, the new hydroxyalkyl halo ethers are converted to tertiary amines which have been found to be excellent foam promoters for sulfate-type detergents. They are thus advantageous for use in combination with the above-described sulfate salt derivatives of the new hydroxyalkyl halo ethers in detergent compositions. These tertiary amines can also be advantageously oxidized, for example with hydrogen peroxide, to make hydroxy-substituted tertiary amine oxides which are very effective components of synthetic detergents.

One convenient method for converting the new hydroxyalkyl halo ethers to tertiary amines is by reaction with a di-lower-alkyl amine. Amines having 1 to about 3 carbon atoms in each of the two alkyl groups are especially suitable for making the new tertiary amine. The products having the general formula

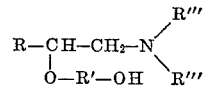

where R and R' represent the previously described radicals and R''' is alkyl of 1 to 3 carbons, are particularly desirable foam promoters. The isomers of the formula

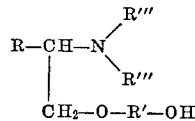

are also useful new products. Hydroxyalkyl amino ethers of these kinds in which R' is saturated, unsubstituted alkylene of 2 to 6 carbon atoms are especially advantageous new products.

The reaction between the hydroxyalkyl halo ether or ether mixture to be converted to amine, and the di-lower-alkyl amine is carried out usually with at least one mole of amine per mole of halo ether. More advantageously an excess of amine is employed with ratios of the order of about 2 to 5 moles of amine, preferably about 2.5 to 3.5 moles of amine, per mole of the ether being useful. Temperatures in the range of about 100° to 200° C. can be used with reaction times of about 1 to 4 hours more or less.

The new hydroxyalkyl amino ethers can be used in a variety of detergents to make compositions of improved properties. Mixtures with primary alkyl sulfate alkali metal salts, for example, in proportions of about 75:25 to about 95:5 parts by weight of the sulfate salt to the hydroxyalkyl tertiary amino-substituted ether give excellent improvement in foam, especially when using amino ethers of the foregoing formulas in which R is alkyl of about 10 to about 14.

Useful tertiary amine oxide compounds of the invention can be made by oxidizing the foregoing tertiary amino-substituted hydroxyalkyl ethers using Caro's acid, hydrogen peroxide, ozone or like oxidizing agents as described in British Patent 437,566, for example. U.S. Patent 2,804,473 describes a method of oxidation with peroxy-carboxylic acids which can be used in making the amine oxides as can other known methods.

The following examples illustrate in more detail suitable methods for making representative new products of the invention, and show some of the advantages of the new products.

EXAMPLE I

A solution of 1 mole (168 g.) of 1-dodecene and 5.4 mole (335 g.) of ethylene glycol in 12.9 mole (1135 g.) of 1,4-dioxane was transferred to a reaction vessel provided with a stirrer, gas inlet tube and thermometer. While stirring, 1 mole (71 g.) of gaseous chlorine was passed into the solution for one hour, the temperature being maintained at 20–25° C. Subsequently the reaction mixture, after determination of the acid content, was neutralized by adding the calculated quantity of a saturated, aqueous solution of sodium bicarbonate, during which phase separation occurred. After separation of the top layer, which contained the product, the aqueous bottom layer was extracted three times with 500-ml. portions of pentane, after which the extracts obtained were added to the separated top layer. The pentane solution obtained was finally washed with water and dried over over $Na_2SO_4$. The pentane was distilled off and the product was rectified at reduced pressure.

At 156–159° C. and 1–1.5 mm. Hg, 77g. of the glycol ether of dodecene chlorohydrin distilled over, which corresponds with 29% of the theory calculated on the olefin.

For comparison the results of experiments performed under various reaction conditions are listed in Table I.

TABLE I

| 1-dodecene (mole) | Glycol (mole) | Chlorine (mole) | Temperature, °C. | Solvent (mole) | Yield, percent m: |
|---|---|---|---|---|---|
| 1 | 5.4 | 1 | 20–25 | None | 6 |
| 1 | 5.4 | 1 | 20–25 | 12.9 dioxane | 29 |
| 1 | 5.4 | 1 | 8 | do | 30 |
| 1 | 5.4 | 1 | 103 | do | 28 |
| 1 | 23 | 1 | 20–25 | 15.2 dioxane | 40 |
| 1 | 5.4 | 1 | 20–25 | 14.7 tetrahydrofurane. | 30 |

Table I shows with particular clarity the influence of the presence of the polar solvent on the yield.

EXAMPLE II

To a mixture of 1 mole (168 g.) of 1-dodecene, 5.4 mole (335 g.) of ethylene glycol and 0.02 mole (0.36 g.) of water was added dropwise in 2 hours with stirring 1 mole (108.5 g.) of t-butyl hypochlorite, the temperature being kept at 45–50° C. From the product separated in phases the top layer was subsequently removed, the bottom layer was extracted three times with 250-ml. portions of pentane, and the extracts were added to the separated top layer. Then the product was washed twice with water, dried over $Na_2SO_4$, and the pentane was distilled off. The product was finally rectified at reduced pressure.

At 164–165° C. and 2 mm. Hg 180 g. of dodecene chlorohydrin glycol ether distilled over, which corresponds with a yield of 68% calculated on the olefin.

The glycol-containing layer can then, after addition of fresh glycol again be reacted, if necessary after a bleed.

EXAMPLE III

Normal tetradecene-1 was reacted with ethylene glycol and tert.butyl hypochlorite under the conditions of Example II and a 64 mole percent yield of tetradecene chlorohydrin monoether of ethylene glycol was obtained, the selectivity being 68 mole percent toward olefin and 64 mole percent toward glycol.

EXAMPLE IV

The hexadecene chlorohydrin monoether of ethylene glycol was made by reacting normal hexadecene-1, ethylene glycol and tert.butyl hypochlorite in mole proportions of 1:5.4:1 at 45° C. for three hours in the presence of 0.02 mole of water. The yield of chlorohydrin ether was 55 mole percent based on the hexadecene-1 intake, 4.5 moles of ethylene glycol and 0.08 mole of unreacted olefin being recovered.

EXAMPLE V

To a solution of 1 mole (264.5 g.) of the glycol ether of dodecene chlorohydrin prepared according to Example II in 661 g. of dry ether was added dropwise and slowly at 5–8° C. with stirring a solution of 1.1 mole (128.2 g.) of chlorosulfonic acid as a 10% w. solution in dry ether, after which stirring was continued for one hour at the same temperature. The HCl formed was then removed at reduced pressure and the reaction product was neutralized by dropwise addition to a 20% w. solution of 1.3 mole (52 g.) of NaOH in water. The temperature then rose to 20–25° C. To remove unsulfated dodecene chlorohydrin glycol ether the product was extracted 5 times with 200-ml. portions of pentane.

The pH of the raffinate thus obtained was then brought to 8–8.5, the water was distilled off at reduced pressure, and the residue was boiled under reflux with isopropanol.

After filtering off the precipitated inorganic salt the isopropanol was distilled off from the filtrate. We obtained 348 g. of sodium salt of the sulfuric ester, which corresponds with a yield of 95% m.

The following Table II gives the foam values of sulfates of alkylene chlorohydrin glycol ethers obtained as above and by similar sulfation of the products of Examples III and IV.

TABLE II

Sulfate of chlorohydrin ether prepared from:         Foam value [1]

(a) 1-dodecene _____ 301
(b) 1-tetradecene _____ 329
(c) 1-hexadecene _____ 201
A mixture of equal parts by weight of
 $(a)+(b)+(c)$ _____ 321
"Teepol" CD [2] _____ 255

[1] According to a standardized dish washing test.
[2] A commercial detergent ($C_8$–$C_{16}$ secondary alkyl sulfate sodium salt).

The effectiveness of the foregoing sulfate ester salts as detergent components is shown by the following results of performance tests with these compounds.

TABLE III

| Chlorohydrin ether sulfate made from ether prepared from— | Wetting power (draves test) | Clear point of solution of 17% active material | Cotton detergency (Tergotometer test) |
|---|---|---|---|
| 1-dodecene | 178 | <0 | 102 |
| 1-tetradecene | 209 | <0 | 116 |
| 1-hexadecene |  | 18 | 126 |
| Blend of equal parts by weight of the above |  | <0 | 121 |

These detergents are biodegradable as shown by the representative results obtained with sulfate salt made from dodecene chlorohydrin monoether of ethylene glycol which showed only 24% detergent left after 4 days and none after 7 days in the Y-water storage test.

EXAMPLE VI

Chlorohydrin monoethers of ethylene glycol made in accordance with Examples II, III and IV were converted to tertiary amine derivatives by reaction with dimethyl amine which was used as a 25% w. solution in water. The reactions were carried out using mole ratios of the chlorohydrin ether to amine of 1:3 and a reaction time of 2 hours at 160° C. The yields of tertiary amino-substituted monoethers of ethylene glycol were 80, 82 and 85 mole percent based on the chlorohydrin ether intake for chlorohydrin ethers made from n-dodecene-1, n-tetradecene-1, and n-hexadecene-1, respectively.

The effectiveness of these tertiary amino-substituted ethers as foam promoters for detergents was shown in tests of dish washing in hard water with $C_{12}$–$C_{15}$ primary alkyl sulfate sodium salts as the detergent. This detergent was used at a concentration of 230 p.p.m. without builders and gave a relative performance figure of 181. When 15% of the sulfate was replaced by the tertiary amino-substituted ethers, tests under the same conditions gave the following results:

TABLE IV

Tertiary amino-substituted hydroxy ether from chlorohydrin ether made from—     Relative effectiveness 1-dodecene _____ 356
1-tetradecene _____ 285
1-hexadecene _____ 202

EXAMPLE VII

Tertiary amine oxides were made from the products of Example VI by oxidizing the tertiary amines with hydrogen peroxide using 97.5% alcohol as solvent in a weight ratio to amine of 4.1:1. The hydrogen peroxide was used in a mole ratio to amine of 1.2:1. Six hours reaction at 60° C. gave tertiary amine oxide yields of 77, 84 and 86 mole percent based on tertiary amine for the amines derived from chlorohydrin ethers made from n-dodecene-1, n-tetradecene-1, and n-hexadecene-1, respectively.

In a test of foam performance carried out using the method described in Example IV but without any detergent, the tertiary amine oxide made from the chlorohydrin ether prepared from n-hexadecene-1 showed the highest results with a rating of 177. The tertiary amine oxide made from the n-tetradecene chlorohydrin monoether of ethylene glycol showed a wetting power of 244 in the Draves test, while the cotton detergencies of these amine oxides in a standard Launderometer test were 93, 95 and 98 for the products made from n-dodecene-1, n-tetradecene-1, and n-hexadecene-1, respectively.

We claim as our invention:

1. A tertiary amine from the group consisting of ether-substituted amines having the formulas

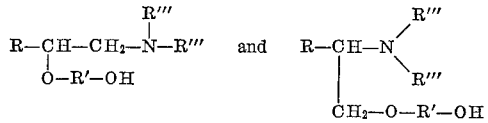

where R is saturated, unsubstituted alkyl, R' is saturated, unsubstituted alkylene of 2 to 8 carbon atoms, and each R''' is an alkyl group of 1 to 3 carbon atoms.

2. A tertiary amine having the formula

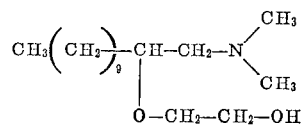

3. An amine oxide of a tertiary amine according to claim 1.

4. An amine oxide having the formula

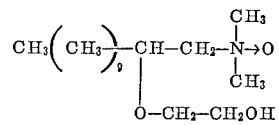

References Cited

UNITED STATES PATENTS 1,518,689 12/1924 Callsen.
2,172,822 9/1939 Tamele et al.
3,029,265 4/1962 Zech.
3,202,714 8/1965 Zimmerer et al.

CHARLES B. PARKER, *Primary Examiner.*

R. L. RAYMOND, *Assistant Examiner.*

U.S. Cl. X.R.

252—152; 260—458, 615